(12) United States Patent
Jung et al.

(10) Patent No.: US 10,815,600 B2
(45) Date of Patent: Oct. 27, 2020

(54) LAUNDRY TREATING APPARATUS

(71) Applicant: LG ELECTRONICS INC., Seoul (KR)

(72) Inventors: Sungwoon Jung, Seoul (KR); Hunjun Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 598 days.

(21) Appl. No.: 15/287,884

(22) Filed: Oct. 7, 2016

(65) Prior Publication Data

US 2017/0101734 A1 Apr. 13, 2017

(30) Foreign Application Priority Data

Oct. 7, 2015 (KR) .......................... 10-2015-0140816

(51) Int. Cl.
*D06F 37/22* (2006.01)
*D06F 39/08* (2006.01)
(Continued)

(52) U.S. Cl.
CPC ............... *D06F 37/22* (2013.01); *D06B 1/02* (2013.01); *D06F 37/26* (2013.01); *D06F 39/085* (2013.01);
(Continued)

(58) Field of Classification Search
CPC ............. A47L 15/4225; A47L 15/4208; A47L 15/4204; A47L 15/4206; A47L 15/4219; A47L 15/4202; A47L 2501/05
(Continued)

(56) References Cited

U.S. PATENT DOCUMENTS

| 4,833,900 A | * | 5/1989 | Babuin | ................... D06F 39/10 |
| | | | | 134/111 |
| 5,660,063 A | * | 8/1997 | Lee | ........................ D06F 39/10 |
| | | | | 68/18 F |

(Continued)

FOREIGN PATENT DOCUMENTS

| DE | 3437886 | 6/1986 |
| DE | 102004050396 | 4/2006 |

(Continued)

OTHER PUBLICATIONS

European Search Report dated Jan. 24, 2017 issued in Application No. 16192818.9.

(Continued)

*Primary Examiner* — David G Cormier
*Assistant Examiner* — Thomas Bucci
(74) *Attorney, Agent, or Firm* — KED & Associates, LLP

(57) ABSTRACT

Provided is a laundry treating apparatus in which a position of a circulation pump is optimized. The laundry treating apparatus includes a tub holding washing water, a drum rotatably disposed within the tub and holding laundry, a nozzle jetting the washing water to an interior of the drum, and a pump unit having a pump body, a drain pump coupled to the pump body and outwardly draining washing water introduced from the interior of the tub to the pump body, and a circulation pump coupled to the pump body and supplying washing water introduced from the interior of the tub to the pump body to the nozzle, wherein the circulation pump is disposed above the pump body.

17 Claims, 11 Drawing Sheets

(51) Int. Cl.
*D06B 1/02* (2006.01)
*D06F 37/26* (2006.01)
*D06F 39/02* (2006.01)
*D06F 39/10* (2006.01)
*D06F 58/24* (2006.01)

(52) U.S. Cl.
CPC .......... *D06F 39/022* (2013.01); *D06F 39/083* (2013.01); *D06F 39/10* (2013.01); *D06F 58/24* (2013.01)

(58) Field of Classification Search
USPC ........ 134/111, 56 D, 58 D, 25.2, 104.1, 186, 134/104.4, 10, 18, 57 D, 104.2, 110, 191; 68/18 F, 208, 58, 207, 13 R, 12.19, 23.5, 68/184; 210/167.01, 409, 411, 454, 106, 210/171
See application file for complete search history.

(56) References Cited

U.S. PATENT DOCUMENTS

| | | | | |
|---|---|---|---|---|
| 6,167,733 | B1* | 1/2001 | Lee | D06F 39/085 68/18 F |
| 7,073,520 | B2* | 7/2006 | Zanello | D06F 39/10 134/110 |
| 7,093,467 | B2* | 8/2006 | Kim | D06F 39/02 134/93 |
| 7,243,512 | B2* | 7/2007 | Kim | D06F 39/085 134/104.2 |
| 7,966,848 | B2* | 6/2011 | Jang | D06F 39/12 68/18 F |
| 8,176,756 | B2* | 5/2012 | Yim | D06F 39/085 68/184 |
| 8,776,297 | B2* | 7/2014 | Im | D06F 33/00 8/159 |
| 9,045,853 | B2* | 6/2015 | Kim | D06F 37/266 |
| 9,422,661 | B2* | 8/2016 | Mantle | D06F 39/10 |
| 9,657,428 | B2* | 5/2017 | Jeong | D06F 39/085 |
| 2004/0148974 | A1* | 8/2004 | No | D06F 39/12 68/12.13 |
| 2004/0163427 | A1* | 8/2004 | Oh | D06F 39/085 68/24 |
| 2004/0206133 | A1* | 10/2004 | Woo | D06F 39/083 68/13 R |
| 2004/0237603 | A1* | 12/2004 | Kim | D06F 39/083 68/15 |
| 2004/0244437 | A1* | 12/2004 | Elexpuru | D06F 39/083 68/13 R |
| 2005/0120758 | A1* | 6/2005 | Thies | D06F 39/10 68/18 R |
| 2005/0223504 | A1* | 10/2005 | Lee | D06F 25/00 8/158 |
| 2006/0000240 | A1* | 1/2006 | Song | D06F 39/085 68/3 R |
| 2007/0240457 | A1* | 10/2007 | Jang | D06F 39/083 68/18 F |
| 2008/0244836 | A1* | 10/2008 | Kim | D06F 34/22 8/159 |
| 2009/0007602 | A1* | 1/2009 | Woo | D06F 39/12 68/208 |
| 2009/0199601 | A1* | 8/2009 | Kim | D06F 39/085 68/208 |
| 2010/0000266 | A1 | 1/2010 | Chung et al. | |
| 2010/0088828 | A1* | 4/2010 | Kim | D06F 39/125 8/159 |
| 2010/0095713 | A1* | 4/2010 | Yim | D06F 39/085 68/19 |
| 2010/0115709 | A1* | 5/2010 | Kim | D06F 39/022 8/159 |
| 2011/0100071 | A1* | 5/2011 | Mazzon | D06F 39/10 68/208 |
| 2012/0246960 | A1* | 10/2012 | Lee | D06F 58/206 34/86 |
| 2013/0074554 | A1* | 3/2013 | Chun | D06F 39/085 68/200 |
| 2013/0276484 | A1* | 10/2013 | Mantle | D06F 39/083 68/18 F |
| 2014/0366588 | A1* | 12/2014 | Kim | D06F 34/18 68/139 |
| 2015/0096129 | A1* | 4/2015 | Sawford | D06F 35/00 8/137 |
| 2015/0240408 | A1 | 8/2015 | Favaro et al. | |

FOREIGN PATENT DOCUMENTS

| | | |
|---|---|---|
| EP | 2 248 935 | 11/2010 |
| EP | 2 918 721 | 9/2015 |
| KR | 10-2007-0113432 | 11/2007 |
| KR | 10-2010-0082481 | 7/2010 |
| KR | 10-2013-0106506 | 9/2013 |
| KR | 10-2015-0081602 | 7/2015 |

OTHER PUBLICATIONS

International Search Report dated Jan. 24, 2017 issued in Application No. PCT/KR2016/011265.

Indian Office Action dated Feb. 28, 2020 issued in IN Application No. 201837017017.

\* cited by examiner

LAUNDRY TREATING APPARATUS

CROSS-REFERENCE TO RELATED APPLICATIONS

This application claims priority under 35 U.S.C. § 119 to Korean Patent Application No. 10-2015-0140816 filed on Oct. 7, 2015, whose entire disclosure is hereby incorporated by reference.

BACKGROUND

1. Field

The present invention relates to a laundry treating apparatus and, more particularly, to a laundry treating apparatus performing washing in a manner of lifting and dropping laundry.

2. Background

In general, a washing machine is classified as a top load washing machine performing washing using swirl water stream of washing water and a drum washing machine performing washing in a manner of lifting and dropping laundry.

That is, in the top load washing machine, an inner tub, a washing tub, is disposed to rotate in a direction perpendicular to a ground, a pulsator provided on a bottom surface of the inner tub rotates to generate a water stream, and the water stream rubs against laundry or the pulsator applies an impact to laundry to perform washing. In contrast, in the drum washing machine, an inner tub, a washing tub, is disposed to rotate in a direction parallel to a ground, and as the inner tub rotates, laundry rubs against an inner wall surface of the inner tub or drops to perform washing.

In the drum washing machine, the drum is rotatably installed within the tub, a water storage tank. Also, a drain pump and a circulation pump are installed in the drum washing machine. The drain pump serves to drain washing water within the tub outwardly during a draining operation. The circulation pump serves to circulate washing water within the tub to an interior of the drum during washing operation.

The circulation pump is connected to an injection nozzle installed in a top cover, an upper panel of the drum washing machine, through a circulation flow channel to supply washing water within the tub to the injection nozzle, whereby the injection nozzle may inject the supplied washing water to the drum to allow laundry within the drum to be evenly wet.

Here, the circulation pump pumps up washing water from the interior of the tub upwardly. Thus, as the circulation pump is disposed in a higher position, the circulation pump may be able to circulate a larger amount of washing water to the interior of the drum.

BRIEF DESCRIPTION OF THE DRAWINGS

The embodiments will be described in detail with reference to the following drawings in which like reference numerals refer to like elements wherein.

DETAILED DESCRIPTION

Hereinafter, a laundry treating apparatus according to an embodiment of the present disclosure will be described with reference to the accompanying drawings.

Figure 1:
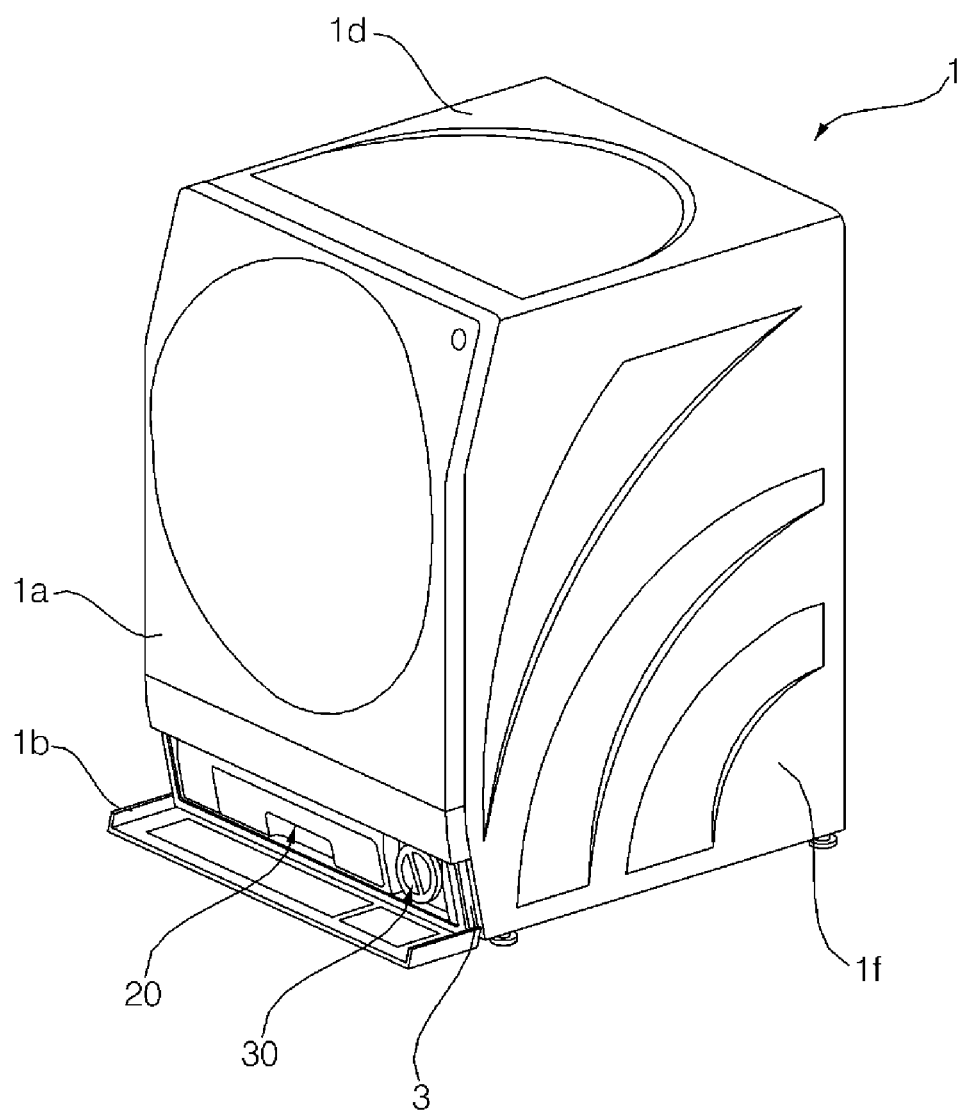
FIG. 1 is a view illustrating an appearance of a laundry treating apparatus according to an embodiment of the present disclosure.
Figure 2:
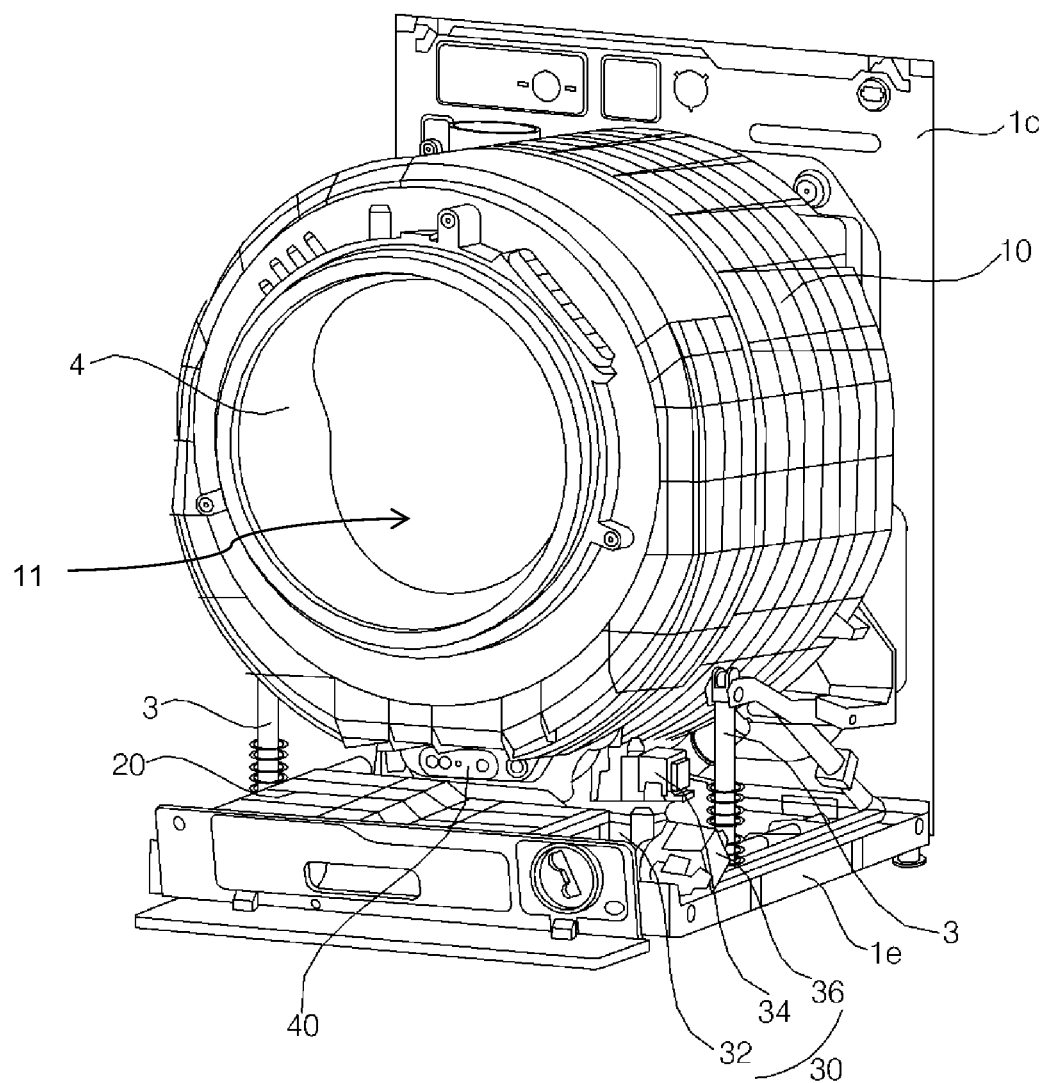
FIG. 2 is a view illustrating an internal configuration of the laundry treating apparatus of FIG. 1.

FIG. 1 is a view illustrating an appearance of a laundry treating apparatus according to an embodiment of the present disclosure, and FIG. 2 is a view illustrating an internal configuration of the laundry treating apparatus of FIG. 1.

Referring to FIGS. 1 and 2, the laundry treating apparatus according to an embodiment of the present disclosure includes a tub 10, an automatic injection device (or injector) 20 disposed below the tub 10, and a pump unit (or assembly) 30 disposed on one side of the automatic injection device 20. The tub 10, the automatic injection device 20, and the pump unit 30 are accommodated within a cabinet 1 forming an appearance of the laundry treating apparatus.

The cabinet 1 may be formed in a quadrangular hexahedron having an internal space in which the tub 10, the automatic injection device 20, and the pump unit 30 are accommodated, and here, the quadrangular hexahedron of the cabinet 1 may be formed by assembling a plurality of panels. That is, the cabinet 1 may include front covers 1a and 1b forming a front surface, a back cover 1c forming a rear surface, a top cover 1d forming an upper surface, a base cover 1e forming a bottom surface, and side covers 1f forming both side surfaces.

The front covers 1a and 1b may include a first front cover 1a disposed on a front side of the tub 10 and a second front cover 1b disposed on a front side of the automatic injection device 20 and the pump unit 30 and disposed on a lower side of the first front cover 1a. Both sides of a lower end portion of the second front cover 1b may be hinge-coupled to the frame 3 so as to be opened and closed. When the second front cover 1b is opened, the automatic injection device 20 and the pump unit 30 are exposed, and when the second front cover 1b is closed, the automatic injection device 20 and the pump unit 30 are invisible.

The tub holds washing water and is disposed within the cabinet 1 such that lower portions thereof are supported by dampers 3 installed on the base cover 1e. Two dampers 3 may be provided to support both sides of the tub 10.

A drum 11 holding laundry is rotatably disposed within the tub 10. The drum is disposed such that a rotational axis thereof is horizontal to a ground, and the drum is disposed to rotate centered on the rotational axis.

A front side of the tub 10 and a front side of the drum are opened and laundry may be introduced to an interior of the drum through the opened front side of the tub 10 and the opened front side of the drum. The first front cover 1a is opened to correspond to the opened front side of the tub 10 and the opened front side of the drum, and a door (not shown) opening and closing the opened front side of the tub 1 and the opened front side of the drum may be installed on the opened portion of the front cover 1a, and a door glass 4 may be coupled to an inner side of the door. The door glass 4 may protrude backwardly on an inner side of the door, so that when the door is closed, the door glass 4 is inserted into the opened front side of the tub 10 and the opened front side of the drum. The door glass 4 may be formed of a transparent material such that the interior of the drum is checked with naked eyes.

A heater 40 heating washing water within the tub 10 is installed below the tub 10. The heater 40 may be disposed between the tub 10 and the automatic injection device 20. The heater 40 may operate or may not operate according to a washing course. That is, the heater 40 may operate at a specific washing course to heat washing water within the tub 10.

A plurality of water holes communicating with the tub 10 may be formed on a circumferential surface of the drum, so that washing water within the tub 10 may enter the drum through the water holes. For example, when the tub 10 is filled with washing water to a predetermined height, the washing water within the tub 10 may be introduced to an interior of the drum to wet laundry of the drum.

A plurality of lifters for lifting and dropping the laundry during a rotation of the drum may be installed on an inner circumferential surface of the drum. That is, the laundry held in the drum may be lifted by the lifters and subsequently dropped so as to be washed.

The automatic injection device 20 may serve to store at least one of a liquid detergent and a liquid softening agent and inject a recommended amount of at least one of the liquid detergent and the liquid softening agent appropriate for a washing load to the interior of the tub 10. Here, the washing load may be a load applied to a motor rotating the drum. The automatic injection device 20 may be spaced apart downwardly from the tub 10 and coupled to an upper surface of the base cover 1e.

The pump unit 30 is disposed on one side of the automatic injection device 20 and coupled to an upper surface of the base cover 1e. The pump unit 30 includes a pump body 32, a circulation pump 34, and a drain pump 36.

The circulation pump 34 circulates washing water introduced to an interior of the pump body 32 from the interior of the tub 10 to an interior of the drum during a washing operation, and the drain pump 36 drains washing water introduced from the interior of the tub 10 to the pump body 32 outwardly during a draining operation.

Figure 3:
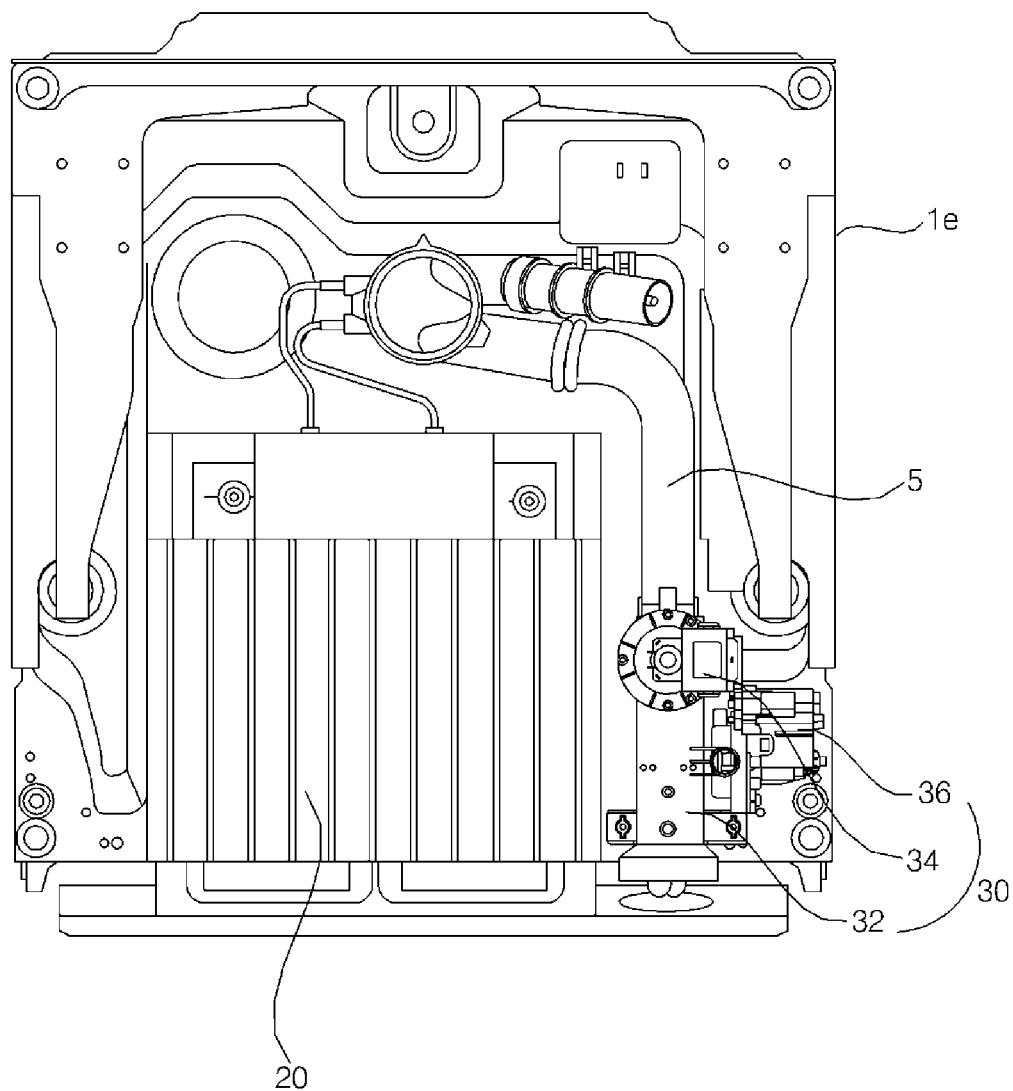
FIG. 3 is a view illustrating a configuration below a tub illustrated FIG. 2, viewed from above.

FIG. 3 is a view illustrating a configuration below the tub illustrated FIG. 2, viewed from above.

Referring to FIGS. 1 to 3, one end of the pump body 32 is coupled to the tub 10 through a connection flow channel 5. That is, one end of the connection flow channel 5 may be coupled to the tub 10 and the other end thereof may be coupled to the pump body 32 so that washing water within the tub 10 may be supplied to the pump body 32.

When viewed from a front side of the laundry treating apparatus, the pump unit 30 is disposed on the right side of the automatic injection device 20. The circulation pump 34 is disposed on an upper side of the pump body 32, and the drain pump 36 is disposed on the right side of the pump body 32 opposite to the automatic injection device 20. When viewed from the front side of laundry treating apparatus, the pump body 32 extends in a forward/backward direction, and the circulation pump 34 is disposed on a rear side than the drain pump 36 in a length direction of the pump body 32 and disposed on an upper side of the pump body 32. The drain pump 36 is disposed on a front side than the circulation pump 34 in the length direction of the pump body 32 and disposed on the right side of the pump body 32.

As the circulation pump 34 is installed in a higher position, a flow rate circulating within the drum is increased. Thus, preferably, the circulation pump 34 is installed on an upper side of the pump body 32. Also, as the circulation pump 34 is installed on an upper side of the pump body 32, a space allowing the automatic injection device 20 to be installed on one side of the pump unit 30 may be secured.

Figure 4:
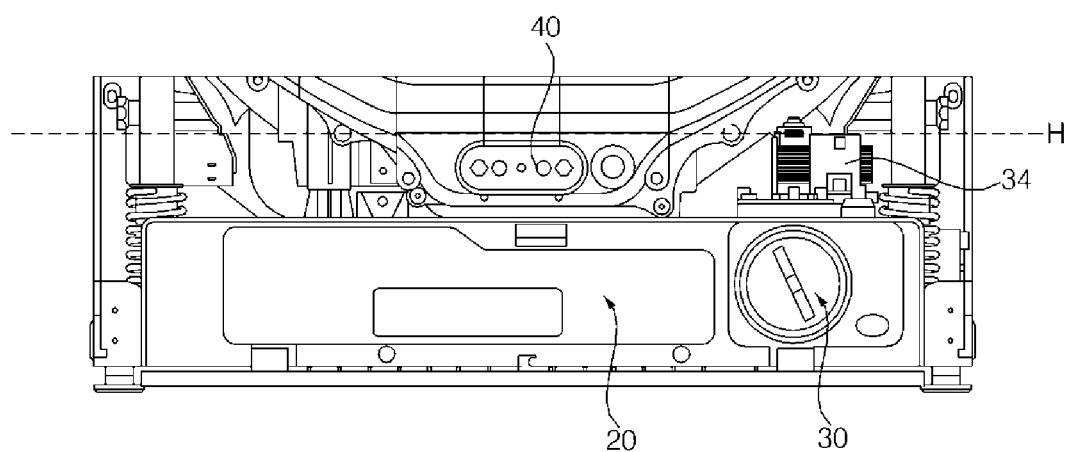
FIG. 4 is a view illustrating a position relation of a circulation pump and a heater illustrated in FIG. 2.

FIG. 4 is a view illustrating a position relation of a circulation pump and a heater illustrated in FIG. 2.

Referring to FIGS. 1 to 4, as mentioned above, the heater 40 serves to heat washing water within the tub 10 in a specific washing course. Thus, in order for the heater 40 to heat washing water within the tub 10 and in order to prevent damage to the heater 40 due to heating, a lowest water level H of washing water within the tub 10 is required to be in a position higher than the heater 40 during a washing operation in the specific washing course.

If the circulation pump 34 is disposed in a position higher than a lowest water level H, it cannot circulate washing water within the tub 10, and thus, preferably, the circulation pump 34 is disposed above the pump body 32 and disposed below the lowest water level H.

Figure 5:
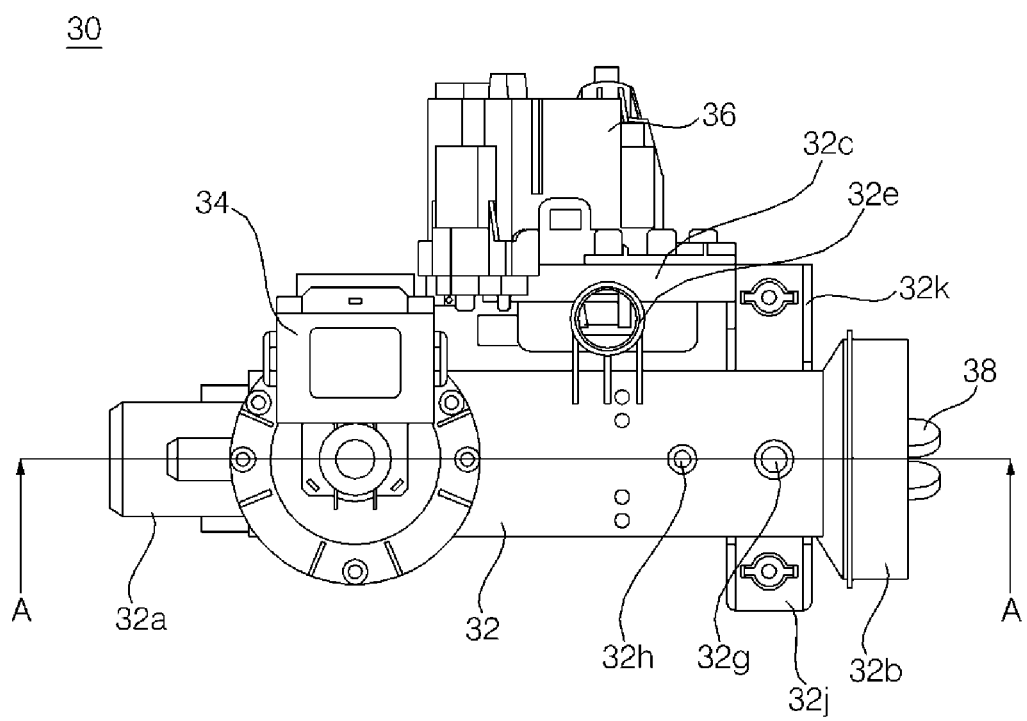
FIG. 5 is a top view of a pump unit illustrated in FIG. 2.
Figure 6:
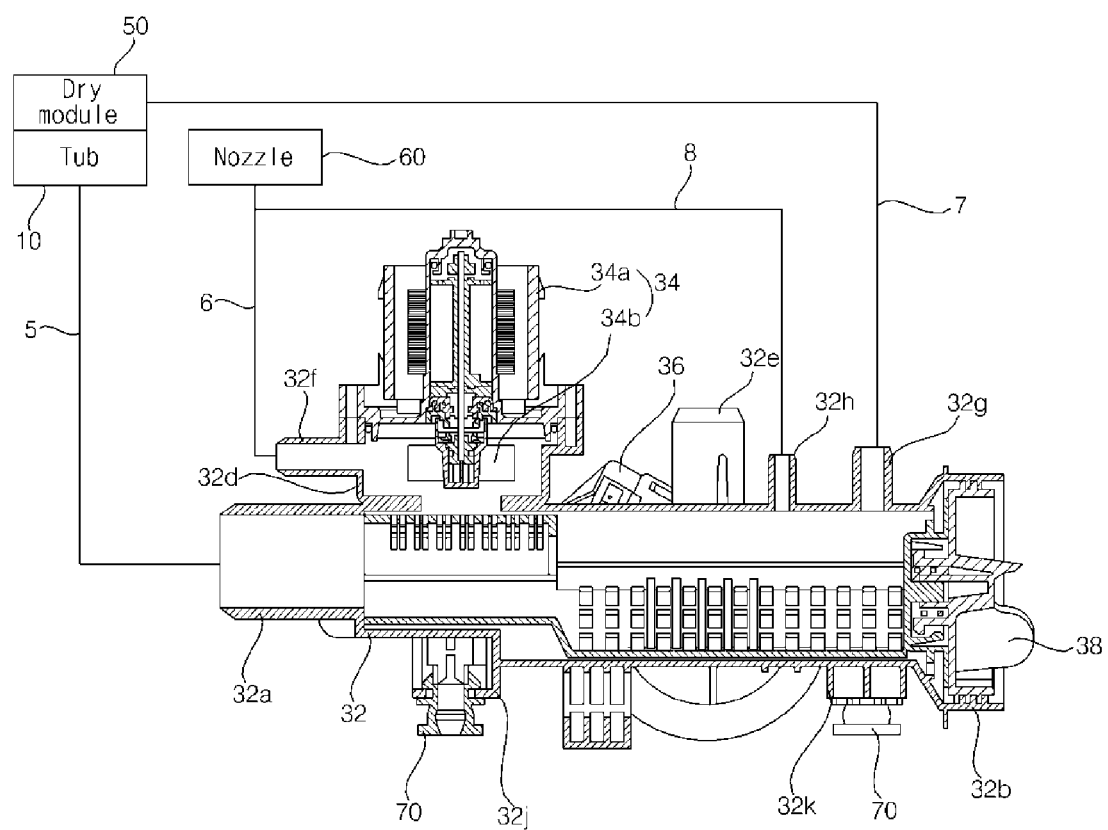
FIG. 6 is a cross-sectional view taken along line A-A of FIG. 5.
Figure 7:
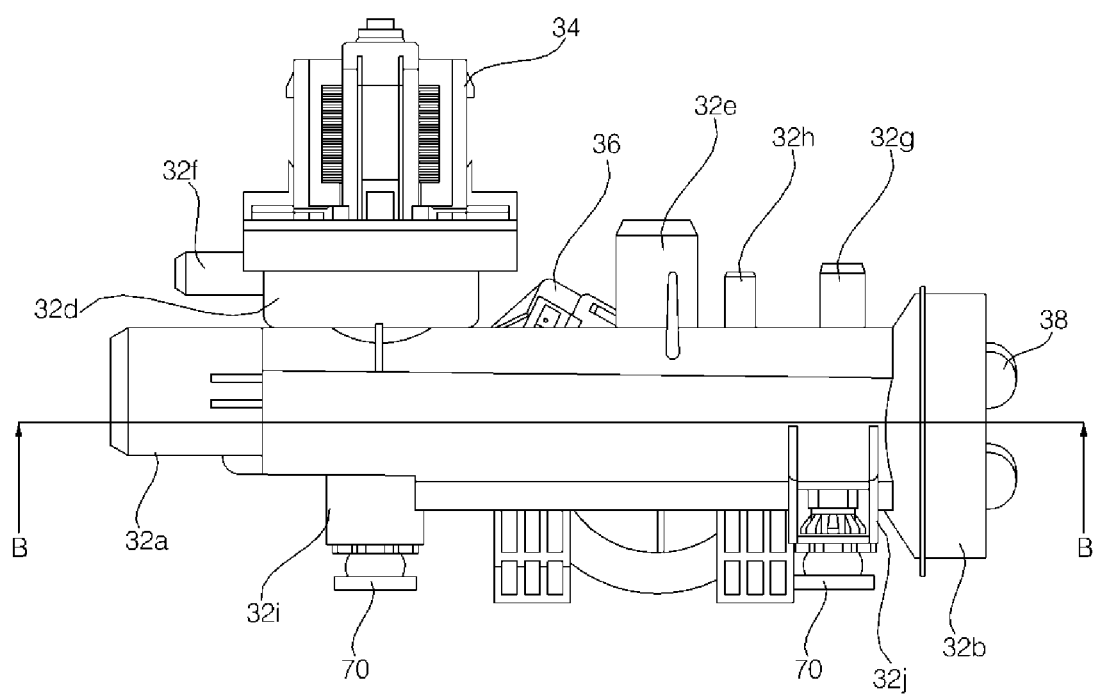
FIG. 7 is a side view of the pump unit illustrated in FIG. 2.
Figure 8:
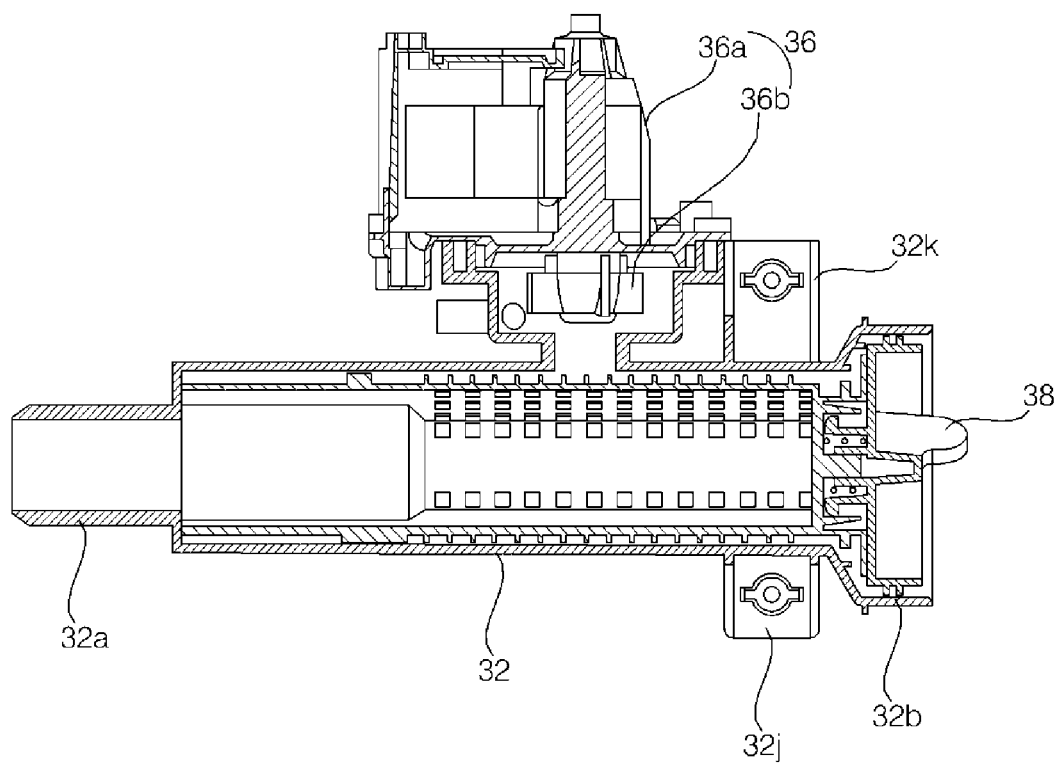
FIG. 8 is a cross-sectional view taken along line B-B of FIG. 7.

FIG. 5 is a top view of a pump unit illustrated in FIG. 2, FIG. 6 is a cross-sectional view taken along line A-A of FIG. 5, FIG. 7 is a side view of the pump unit illustrated in FIG. 2, and FIG. 8 is a cross-sectional view taken along line B-B of FIG. 7.

Referring to FIGS. 1 to 8, a dry module for drying laundry within the drum is further installed above the tub 10, and a nozzle 60 jetting washing water to the interior of the drum is installed on the top cover 1d of the cabinet 1. The dry module 50 and the nozzle 60 are accommodated in the cabinet 1.

The pump body 32 has an inlet portion 32a formed at one end thereof in a length direction and allowing washing water from the interior of the tub 10 to be introduced therethrough, and a filter insertion portion (port) 32b formed at the other end thereof in the length direction to allow a filter 38 to be inserted thereinto. The inlet portion 32a and the filter insertion portion 32b are coaxially disposed.

The inlet portion 32a may be connected to the tub 10 through the connection flow channel 5 so that washing water within the tub 10 may be introduced thereto. That is, one end of the connection flow channel 5 is coupled to the tub 10 and the other end thereof is coupled to the inlet portion 32a. The filter insertion portion 32b may have the largest diameter, compared with other portions of the pump body 32. The filter 38 is inserted into the pump body 32 through the filter insertion portion 32b to filter out a foreign object from washing water within the pump body 32. Only a handle portion of the filter 38 is disposed within the filter insertion portion 32b.

The drain pump 36 and the circulation pump 34 are coupled to an outer circumferential surface of the pump body 32. A drain pump coupling portion 32c to which the drain pump 36 is coupled protrudes from the pump body 32 in a radial direction, and a circulation pump coupling portion (or mount) 32d to which the circulation pump 34 is coupled protrudes from the pump body 32 in a radial direction.

When the pump unit 30 is coupled to the base cover 1e, the drain pump coupling portion (or mount) 32c protrudes laterally from the pump body 32 and the circulation pump coupling portion 32d protrudes upwardly from the pump body 32.

The drain pump coupling portion 32c and the circulation pump coupling portion 32d are disposed to be spaced apart from each other in a length direction of the pump body 32.

Also, the drain pump coupling part 32c and the circulation pump coupling part 32d are disposed to be perpendicular to each other in a circumferential direction of the pump body 32. Thus, when the drain pump 36 is coupled to the drain pump coupling portion 32c and the circulation pump 34 is coupled to the circulation pump coupling portion 32d, the drain pump 36 and the circulation pump 34 may be disposed to be spaced apart from each other in a length direction of the pump body 32 and disposed to be perpendicular to each other in a circumferential direction of the pump body 32.

The drain pump 36 includes a drain pump motor 36a and a drain pump impeller 36b coupled to a rotational shaft of the drain pump motor 36a. The drain pump impeller 36b is inserted and disposed in the drain pump coupling portion 32c, and the drain pump motor 36a is coupled to an outer side of the drain pump coupling portion 32c. A drain port 32e protrudes from an outer circumferential surface of the drain pump coupling portion 32c in a radial direction. The drain port 32e is disposed to protrude upwardly from the pump body 32. The drain port 32e is connected to a drain flow channel (not shown). The drain flow channel drains washing water discharged from the drain port 32e to outside of the cabinet 1.

When the drain pump motor 36a is driven so the rotational shaft of the drain pump motor 36a rotates, the drain pump impeller 36b is rotated to intake washing water from the interior of the pump body 32 and discharge the washing water to the drain port 32e, and the washing water discharged to the drain port 32e may be drained to outside of the cabinet 1 through the drain flow channel.

The circulation pump 34 includes a circulation pump motor 34a and a circulation pump impeller 34b coupled to a rotational shaft of the circulation pump motor 34a. The circulation pump impeller 34b is insertedly disposed in the circulation pump coupling portion 32d, and the circulation pump motor 34a is coupled to an outer side of the circulation pump coupling portion 32d. A circulation port 32f protrudes from an outer circumferential surface of the circulation pump coupling portion 32d in a radial direction. The circulation port 32f is disposed above the pump body 32 and parallel to the pump body 32 in a length direction.

The circulation port 32f is connected to the nozzle 60 through a circulation flow channel 6. That is, one end of the circulation flow channel is coupled to the circulation port 32f and the other end thereof is coupled to the nozzle 60.

When the circulation pump motor 34a is driven so the rotational shaft of the circulation pump motor 34a is rotated, the circulation pump impeller 34b is rotated, whereby the circulation pump impeller 34b intakes washing water from the interior of the pump body 32 and discharges the intaken washing water to the circulation port 32f and the washing water discharged to the circulation port 32f is moved to the nozzle 60 through the circulation flow channel 6, and thus, the nozzle 60 may jet washing water to the interior of the drum. The washing water jetted by the nozzle 60 to the interior of the drum may wet laundry within the drum and may be held within the tub 10 through the water holes formed in the drum.

When the circulation pump 34 is coupled to the circulation pump coupling portion 32d and the drain pump 36 is coupled to the drain pump coupling portion 32c, the circulation pump impeller 34b is disposed on an upper side than the drain pump impeller 36b.

A residual water (or leftover water) receiver port 32g and an air boss 32h are further formed on the pump body 32. The residual water receiver port 32a and the air boss 32h may communicate with an internal space of the pump body 32 and protrude upwardly from the pump body 32. The residual water receiver port 32g has a diameter greater than that of the air boss 32h.

The residual water receiver port 32g is connected to the dry module 50 through a residual water receiver flow channel 7. That is, one end of the residual water receiver flow channel 7 is coupled to the residual water receiver port 32g, and the other end thereof is coupled to the dry module 50. In a process in which the dry module 50 dries the laundry within the drum, condensate water generated in the dry module 50 flows through the residual water receiver flow channel 7 and is subsequently introduced to the interior of the pump body 32 through the residual water receiver port 32g, and when the drain pump 36 is driven the condensate water may be discharged to outside of the cabinet 1 through the drain flow channel.

The air boss 32h is connected to the circulation flow channel 6 through an air boss flow channel 8. That is, one end of the circulation flow channel 6 is coupled to the air boss 32h and the other end thereof is coupled to the circulation flow channel 6 corresponding to a portion between the circulation port and the nozzle 60. The air boss 32h allows washing water discharged from the circulation port 32f to the circulation flow channel 6 to be smoothly moved to the nozzle 60.

Meanwhile, fastening portions (or mounts) 32i, 32j, and 32k to be coupled to the base cover 1e of the cabinet 1 are formed in the pump body 32. The fastening portions 32i, 32j, and 32k include a first fastening portion 32i formed on a lower side opposite to the circulation pump 34, a second fastening portion 32j protruding to one side from a lower side between the drain pump 36 and the filter insertion portion 32b, and a third fastening portion 32k protruding from a lower side between the drain pump 36 and the filter insertion portion 32b to a lower side.

Vibration displacements were experimented, while changing positions of the first fastening portion 32i, the second fastening portion 32j, and the third fastening portion 32k. Results of the experimentation showed that, when the first fastening portion 32i is positioned on a lower side opposite to the circulation pump 34, the second fastening portion 32j is positioned to protrude to one side from a lower side between the drain pump 36 and the filter insertion portion 32b, and the third fastening portion 32k is positioned to protrude to the other side from the lower side between the drain pump 36 and the filter insertion portion 32b, a vibration displacement when the drain pump 36 was driven was 0.0044 mm and a vibration displacement when the circulation pump 34 was driven was 0.0053 mm, having the smallest vibration displacements.

A mount 70 absorbing vibration is coupled to each of the first fastening portion 32i, the second fastening portion 32j, and the third fastening portion 32k. Since the first fastening portion 32i, the second fastening portion 32j, and the third fastening portion 32k have the same structure, only the second fastening portion 32j will be described as an example, for the purposes of description.

One end of the mount 70 is inserted so as to be coupled to the fastening portion 32j, and the other end thereof is mounted on the base cover 1e of the cabinet 1 and subsequently coupled to the base cover 1e through the fastening member 80 illustrated in FIG. 10. The fastening member 80 may be formed as a screw, and may penetrate through the base cover 1e from a lower side of the base cover 1e and may subsequently inserted into the mount 70 to couple the mount 70 to the base cover 1e.

Figure 9:
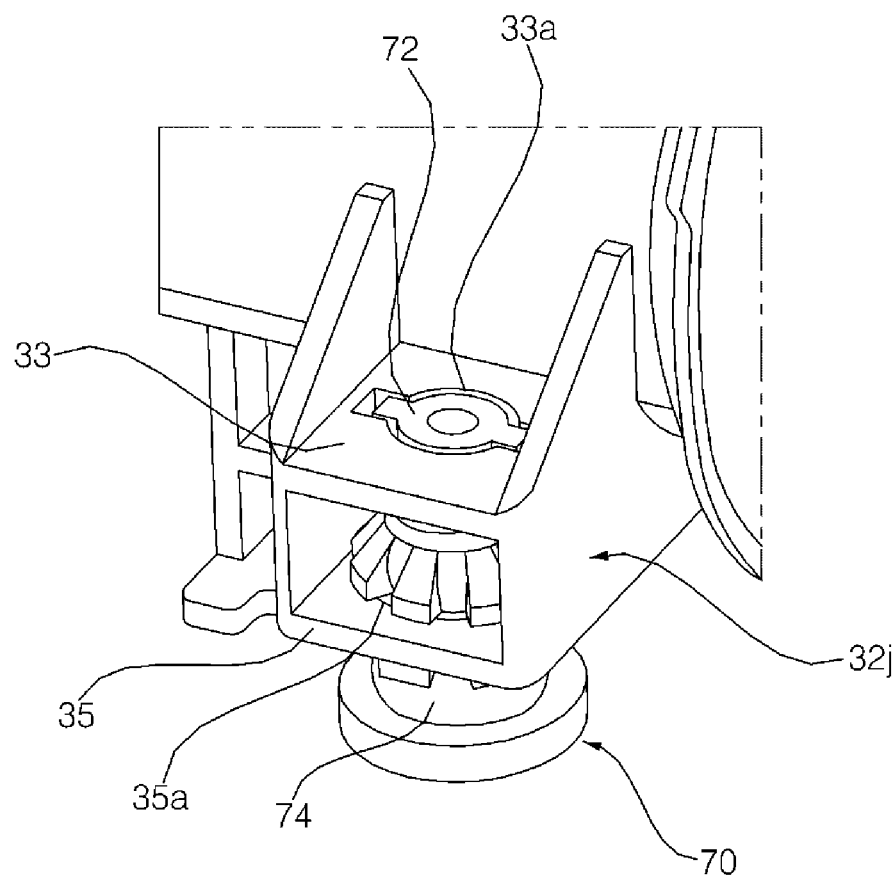
FIG. 9 is a view illustrating a fastening unit of a pump unit.
Figure 10:
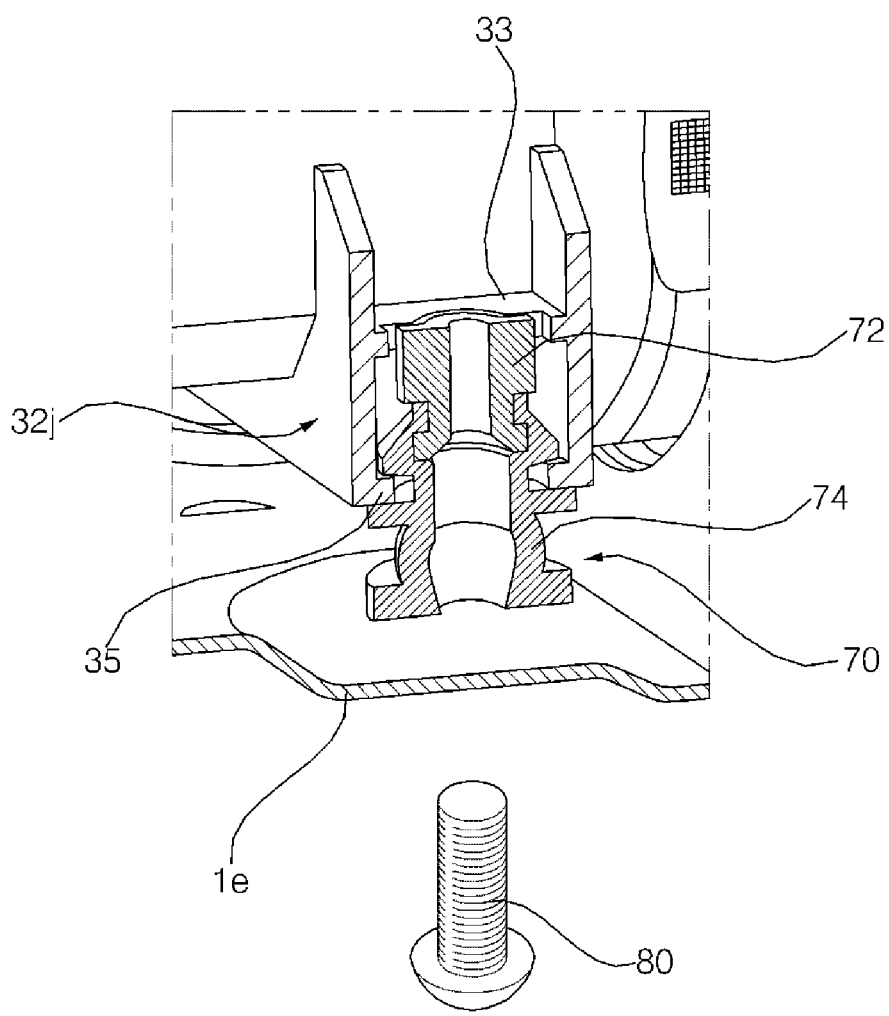
FIG. 10 is a cross-sectional view of FIG. 9.
Figure 11:
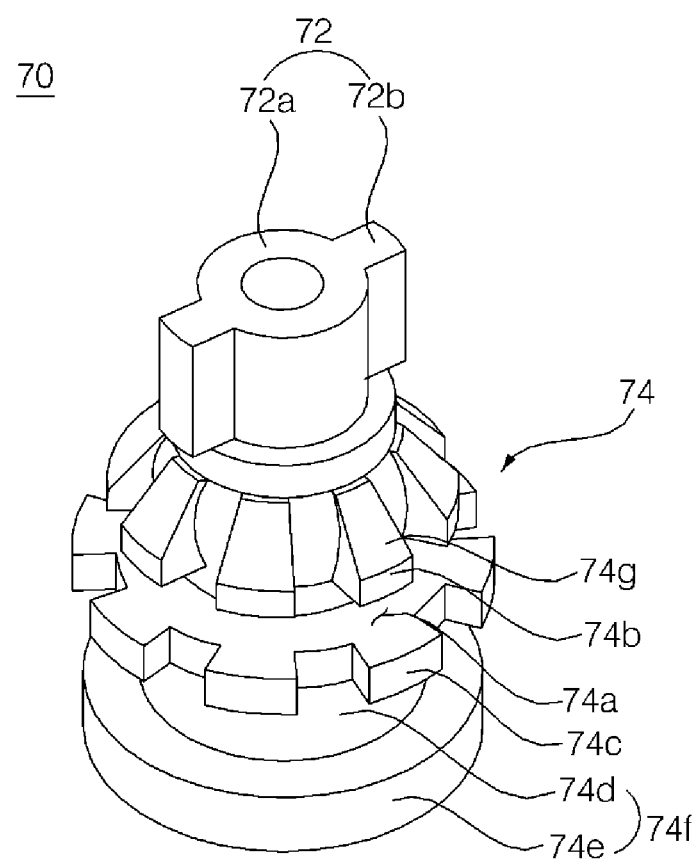
FIG. 11 is a view illustrating a mount of FIG. 9.

FIG. 9 is a view illustrating a fastening unit of a pump unit, FIG. 10 is a cross-sectional view of FIG. 9, and FIG. 11 is a view illustrating a mount of FIG. 9.

Referring to FIGS. 9 to 11, the fastening portion 32j includes a first fastening plate 33 and a second fastening plate 35 disposed to be spaced apart from each other vertically. The first fastening plate 33 is disposed above the second fastening plate and the second fastening plate 35 is disposed below the first fastening plate 33. Upper and lower surfaces of the first fastening plate 33 and the second fastening plate 35 are formed as flat surfaces. The first fastening plate 33 and the second fastening plate 35 are disposed to be parallel to each other. A first fastening hole 33a is formed in the first fastening plate 33, and a second fastening hole 35a is formed in the second fastening plate 35.

An interior of the mount 70 in which the fastening member 80 is inserted is formed to be hollow so that the fastening member 80 is inserted therein and coupled to the base cover 1e. The hollow formed in the mount 70 is formed to extend vertically.

The mount 70 includes a hard part 72 inserted into the first fastening hole 33a formed in the first fastening plate 33 and a soft part 74 formed to be softer than the hard part 72 and inserted into the second fastening hole 35a formed in the second fastening plate 35. The soft part 74 may be formed of rubber, and the hard part 72 may be formed of engineering plastic or steel.

The hard part 72 and the soft part 74 are integrally formed. After the hard part 72 is first molded, when the soft part 74 is molded in a mold pattern, the hard part 72 is put into the mold pattern together to manufacture the mount 70 in an insert-injection method such that the hard part 72 and the soft part 74 are integrally formed.

The hard part 72 includes a circular base portion 72a and at least one rotation preventing protrusion portion 72b protruding from an outer circumferential surface of the base portion 72a in a radial direction. The first fastening hole 33a formed in the first fastening plate 33 is formed to have a shape corresponding to a shape of the hard part 72. When the mount 70 is fastened to the base cover 1e through the fastening member 80, the rotation preventing protrusion portion 72b may be in contact with the first fastening plate 33 within the first fastening hole 33a, preventing rotation of the mount 70, whereby the mount 70 may be firmly fastened to the base cover 1e.

The soft part 74 includes a groove 74a corresponding to the second fastening hole 35a, a first arrest portion 74b formed above the groove 74a, a second arrest portion 74c formed below the groove 74a, and a buffer portion 74f extending from the second arrest portion 74c downwardly so as to be in contact with the base cover 1e.

The groove 74a is formed to have a shape corresponding to a shape of the second fastening hole 35a and formed along an outer circumferential surface of the mount 70. When the mount 70 is coupled to the fastening portion 32j, the second fastening plate 35 is insertedly disposed in a groove 74a positioned between the first arrest portion 74b and the second arrest portion 74c. The first arrest portion 74b is caught by an upper surface of the second fastening plate 35, a surface of the second fastening plate 35 facing the first fastening plate 33, the second arrest portion 74c is caught by a lower surface of the second fastening plate 35, the opposite surface of the second fastening plate 35 facing the first fastening plate 33, and the buffer portion 74f protrudes downwardly from the second fastening plate 35, is mounted on the base cover 1e, and absorbs vibrations transmitted to the base cover 1e when at least one of the drain pump 36 and the circulation pump 34 is driven.

The first arrest portion 74b and the second arrest portion 74c protrude in a radial direction of the mount 70. A plurality of first arrest portions 74b are formed to be spaced apart from each other in a circumferential direction of the mount 70, and a plurality of second arrest portions 74c are formed to be spaced apart from each other in a circumferential direction of the mount 70. Also, a plurality of first arrest portions 74b may be formed to be spaced apart from each other in the circumferential direction of the mount 70 and only a single second arrest portion 74c may be continuously formed in the circumferential direction of the mount 70. Conversely, only one first arrest portion 74b may be continuously formed in the circumferential direction of the mount 70, and a plurality of second arrest portions 74c may be formed to be spaced apart from each other in the circumferential direction of the mount 70.

The first arrest portion 74b may be formed such that a front end thereof inserted into the second fastening hole 35a is formed as a sloped surface 74g, so that the soft part 74 may be easily inserted into the second fastening hole 35a.

The buffer portion 74f includes an extending portion 74d extending from the second arrest portion 74c in an axial direction and a contact portion 74e protruding from an end portion of the extending portion 74d in a radial direction so as to come into contact with the base cover 1e of the cabinet. Preferably, the extending portion 74d protrudes downwardly from the second arrest portion 74c by a predetermined length sufficient for absorbing vibrations transmitted from the pump unit 30 to the base cover 1e.

As described above, in the laundry treating apparatus according to an embodiment of the present disclosure, since the mount 70 directly couple the pump unit 30 to the cabinet 1, vibrations may be reduced, since the circulation pump 34 of the pump unit 30 is disposed above the pump body 32, a flow rate of washing water circulating from the interior of tub 10 to the interior of the drum during a washing operation may be increased and a space allowing the automatic injection device 20 to be installed therein may be secured on one side of the pump unit 30.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

An aspect of the present disclosure provides a laundry treating apparatus in which a position of a circulation pump is optimized. Another aspect of the present disclosure provides a laundry treating apparatus in which a component installation space is secured. Technical subjects of the present invention that may be obtained in the present invention are not limited to the foregoing technical subjects and any other technical subjects not mentioned herein may be easily understood by a person skilled in the art from the present disclosure and accompanying drawings.

In an aspect, a laundry treating apparatus may include: a tub holding washing water; a drum rotatably disposed within the tub and holding laundry; a nozzle jetting the washing water to an interior of the drum; and a pump unit having a pump body, a drain pump coupled to the pump body and outwardly draining washing water introduced from the interior of the tub to the pump body, and a circulation pump coupled to the pump body and supplying washing water introduced from the interior of the tub to the pump body to the nozzle, wherein the circulation pump is disposed above the pump body.

In another aspect, a laundry treating apparatus may include: a tub holding washing water; a drum rotatably disposed within the tub and holding laundry; a nozzle jetting the washing water to an interior of the drum; and a pump unit having a pump body, a drain pump coupled to the pump body and outwardly draining washing water introduced from the interior of the tub to the pump body, and a circulation pump coupled to the pump body and supplying washing water introduced from the interior of the tub to the pump body to the nozzle, wherein the drain pump and the circulation pump are coupled to an outer circumferential surface of the pump body.

Details of embodiments are included in detailed descriptions and drawings. In the laundry treating apparatus according to an embodiment of the present disclosure, since the circulation pump of the pump unit is disposed above a pump body, a flow rate of washing water circulating from the interior of the tub to the drum during a washing operation may be increased. Also, a space in which the automatic injection device is installed may be secured on one side of the pump unit.

Advantages and effects of the present invention that may be obtained in the present invention are not limited to the foregoing effects and any other technical effects not mentioned herein may be easily understood by a person skilled in the art from the present disclosure and accompanying drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treating apparatus comprising:
   a tub;
   a drum provided within the tub;
   a nozzle to spray water into an interior of the drum;
   a pump assembly having a pump body receiving water from the tub, a drain pump coupled to the pump body and draining the water from the pump body, and a circulation pump coupled to the pump body pumping water in the pump body to the nozzle; and
   a cabinet having an internal space to accommodate the tub, the drum, the nozzle, and the pump assembly,
   wherein the circulation pump is positioned above the pump body,
   wherein the pump body includes an inlet formed at a first distal end of the pump body and a filter insertion port formed at a second distal end of the pump body that is opposite to the first distal end,
   wherein the inlet receives washing water from an interior of the tub, and the filter insertion port receives a filter inserted into the interior of the pump body,
   wherein a first fastening mount is formed on a lower side of the pump body and opposite to the circulation pump, a second fastening mount is formed to protrude to one side from the lower side of the pump body and between the drain pump and the filter insertion port, and a third fastening mount formed to protrude to another side of the pump body from the lower side of the pump body and between the drain pump and the filter insertion port,
   wherein each of the first to third fastening mounts includes a first fastening plate having a first hole and a second fastening plate having a second hole positioned below the first hole,
   wherein a first mount post, a second mount post, and a third mount post are connected to corresponding ones of the first to third fastening mounts, each of the first to third mount posts including a first end and a second end, and
   wherein the first ends of the first to third mount posts are inserted into the first and the second holes of the corresponding ones of the first to third fastening mounts, and the second ends of the first to third mount posts are mounted on a base cover of the cabinet such that each of the first to third fastening mounts is coupled to the base cover of the cabinet via the first to third mount posts.

2. The laundry treating apparatus of claim 1, wherein the circulation pump is provided below a lowest water level within the tub during a washing operation.

3. The laundry treating apparatus of claim 2, further comprising:
   a heater heating washing water within the tub, wherein the lowest water level of the water during the washing operation is higher than the heater within the laundry apparatus.

4. The laundry treating apparatus of claim 1, wherein
   the circulation pump includes a circulation pump impeller,
   the drain pump includes a drain pump impeller, and
   the circulation pump impeller of the circulation pump is disposed above the drain pump impeller.

5. The laundry treating apparatus of claim 1, wherein a drain pump coupling mount and a circulation pump coupling mount are formed on an outer circumferential surface of the pump body, and
   wherein the drain pump is coupled to the drain pump coupling mount and the circulation pump is coupled to the circulation pump coupling mount.

6. The laundry treating apparatus of claim 5, wherein the drain pump coupling mount and the circulation pump coupling mount are positioned to be perpendicular to each other in a circumferential direction of the pump body.

7. The laundry treating apparatus of claim 5, wherein the drain pump coupling mount and the circulation pump coupling mount are spaced apart from each other in a length direction of the pump body.

8. The laundry treating apparatus of claim 1, further comprising:
a circulation flow channel connecting the nozzle and the circulation pump, wherein the pump body further includes an air boss connected to the circulation flow channel.

9. The laundry treating apparatus of claim 1, wherein each of the second ends of the first to third mount posts has a hollow cavity configured to receive a fastener inserted through the base cover of the cabinet.

10. The laundry treating apparatus of claim 4, wherein:
the circulation pump impeller has an axis of rotation that extends in vertical direction and intersects a first horizontal direction associated with a longitudinal length of the pump body, and
the drain pump impeller has an axis of rotation that extends in a second horizontal direction that is intersects the first horizontal associated with the longitudinal length of the pump body.

11. The laundry treating apparatus of claim 1, wherein the filter insertion port is provided vertically lower than an opening of the drum.

12. The laundry treating apparatus of claim 1, wherein the filter includes a handle portion that is positioned in the filter insertion port when the filter is received in the pump body.

13. The laundry treating apparatus of claim 1, wherein the first ends of the first to third mount posts include a first material, and the second ends of the first to third mount posts include a second material that is softer than the first material.

14. The laundry treating apparatus of claim 13, wherein the first material includes a plastic or steel, and the second material includes rubber.

15. The laundry treating apparatus of claim 1, wherein each of the first ends of the first to third mount posts includes:
a circular base; and
at least one protrusion extending from an outer circumferential surface of the circular base in a radial direction, and
wherein the at least one protrusion is configured to engage a portion of the first fastening plate in the corresponding one of the first to third fastening mounts.

16. The laundry treating apparatus of claim 1, wherein each of the first to third mount posts includes:
a groove corresponding to the second hole in the second fastening plate in the corresponding one of the first to third fastening mounts;
a first arrest extension formed on a first side of the groove to contact a first surface of the second fastening plate in the corresponding one of the first to third fastening mounts; and
a second arrest extension formed on a second side of the groove to contact a second surface of the second fastening plate in the corresponding one of the first to third fastening mounts, the second surface of the second fastening plate being opposite to the first surface of the second fastening plate.

17. The laundry treating apparatus of claim 16, wherein each of the second ends of the first to third mount posts includes:
a buffer base extending from the second arrest extension to contact the base cover of the cabinet.

* * * * *